3,752,654
ABSORPTION UNIT FOR THE ABSORPTION OF
CARBON DIOXIDE
Dag O. A. Johannisson and Ake G. R. Wictorin, Lidingo,
Sweden, assignors to Aga Aktiebolag, Lidingo, Sweden
Filed Feb. 10, 1972, Ser. No. 225,035
Claims priority, application Sweden, Feb. 15, 1971,
1,859/71
Int. Cl. B01d 53/04; B01j 1/14; A62b 7/10
U.S. Cl. 23—284                                                6 Claims

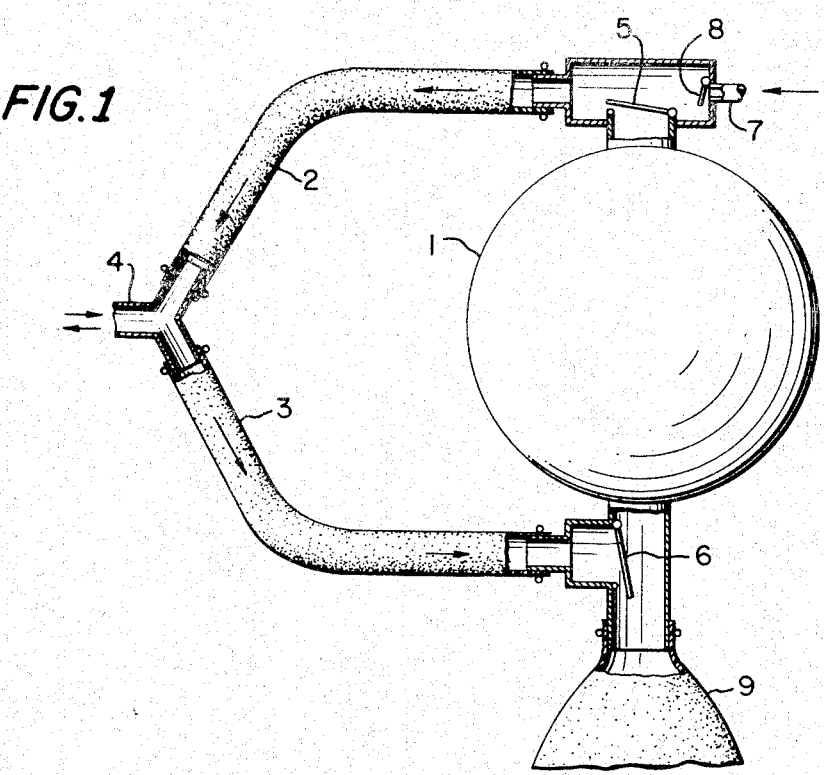
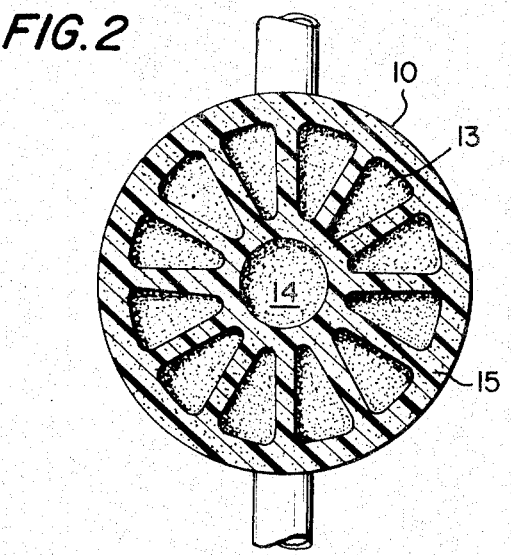
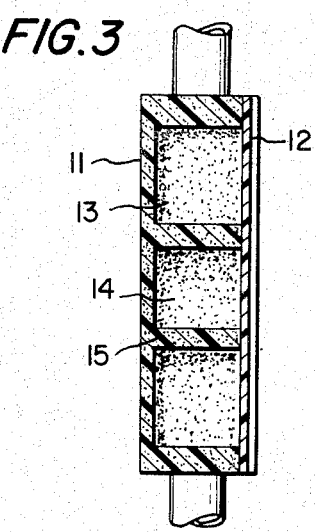

ABSTRACT OF THE DISCLOSURE

In an absorption unit for the absorption of carbon dioxide, especially for a breathing apparatus having a substantially closed gas system the space inside the unit is divided in a plurality of chambers, each one of which is filled with a carbon dioxide absorbing substance and bounded by walls of a porous material permitting the gas to pass from an inlet of the unit, through the walls and the substance to an outlet of the unit.

FIELD OF THE INVENTION

The present invention refers to an absorption unit for the absorption of carbon dioxide of the kind which preferably can be used in a breathing apparatus having a substantially closed gas system.

BACKGROUND OF THE INVENTION

In a breathing apparatus having a substantially closed gas system breathing gas is caused to circulate while carbon dioxide is absorbed and oxygen added so that the oxygen which is supplied to a patient is compensated for. An absorption unit for that purpose comprises a container with an inlet and an outlet and holding a substance adapted for absorbing carbon dioxide.

PRIOR ART

In prior absorption units which have comprised a container, the entire interior of which has been filled with the carbon dioxide absorbing substance it has been possible to obtain a time of use in the order of 2 hours, which means that after this time the carbon dioxide has been able to pass through the absorption unit without being absorbed. Then the total amount of the carbon dioxide absorbing substance has not been consumed but the passage of carbon dioxide through the absorption unit has been enabled since the carbon dioxide absorbing properties of this substance has been used up within certain channels or passages inside the substance.

SUMMARY OF THE INVENTION

According to the present invention a much better exploitation of the carbon dioxide absorbing substance can be achieved in the same time as only a smaller amount of this substance is needed. This result has been achieved in that the space inside the container is divided into a plurality of chambers, each one of which is filled with the carbon dioxide absorbing substance and in all directions bounded by partitions made of a porous material, such as polyether foamed plastic.

BRIEF DESCRIPTION OF THE DRAWING

The invention is described below with reference to the annexed drawing, in which FIG. 1 schematically shows a breathing apparatus with an absorption unit according to the invention, FIG. 2 shows a section of the absorption unit and FIG. 3 shows a section perpendicular to the section of FIG. 2.

DESCRIPTION OF THE PREFERRED EMBODIMENT

The absorption unit is made of a container 1 which is connected with a tube 4 leading to a patient over a breathing in tube 2 and a breathing out tube 3. In the closed gas system which is formed by the container 1 and the tubes 2 and 3 check valves 5 and 6 are inserted for controlling the direction of the gas flow inside the gas system. A conduit 7 for supplying fresh breathing gas intended for compensating for oxygen which has been used up by the patient is connected with the breathing in tube 2 and this conduit 7 is provided with a check valve 8. Finally the gas system comprises a breathing bag 9 having variable volume, for instance a rubber bag which is connected with the inlet of the absorption unit 1.

From FIGS. 2 and 3 it is seen that the absorption unit 1 within a cylindrical outer wall 10 which is connected with a bottom 11 and closed by a lid 12 comprises a plurality of sector formed chambers 13, in this case twelve chambers, which surround a central, cylindrically formed chamber 14. These chambers are bounded in all directions by partitions 15 of a porous material which preferably consists of polyether foamed plastic. Thus, the partitions form an outer annular part, an inner annular part and between these a plurality of radially directed partitions, in this case twelve partitions.

FIG. 3 indicates that the porous material 15 also can form the bottom and the lid of the chambers 13 and 14, but it is also possible that the bottom 11 and the lid 12 of the container 1 may lie directly and sealingly against the outer annular part, the inner annular part and the radially directed partitions of the porous material.

By this configuration of the absorption unit the result is obtained that it comprises a much smaller amount of the carbon dioxide absorbing substance compared with the prior absorption units. While the prior absorption units had to be filled with about 600 gr. of the carbon dioxide absorbing substance the unit according to the invention needs only about 450 gr. In spite of this the time of use has been expanded from about 2 hours with the prior unit to about 3½ hours with the unit according to the invention. Thus, a substantial improvement has been obtained in these two regards, and furthermore, the partitions of the porous material contributes to hold any dust emanating from the carbon dioxide absorbing substance. This substance may be of the type called "sodasorb" and consists of a granulate of sodiumhydroxide-caustic potash.

Preferably, the lid 12 is fastened to the cylindrical wall of the container so that a certain compression of the porous material in the partitions 15 is obtained, whereby a sufficient sealing is achieved between this porous material and the cylindrical wall and the plane bottom and lid of the container.

Thereupon, the lid can be joined to the cylindrical wall by glueing since a used unit normally is disposed with and replaced by a fresh unit.

It is claimed:

1. Absorption unit for the absorption of carbon dioxide, especially for a breathing apparatus having a substantially closed gas system, in which breathing gas is caused to circulate while carbon dioxide is absorbed and oxygen is added, comprising a container having an inlet and an outlet and holding a carbon dioxide absorbing substance, characterized in that the carbon dioxide absorbing substance is placed in a plurality of chambers (13, 14) in the container (1, 10, 11, 12) which are separated from each other, whereas each chamber is bounded by partitions

(15) of a porous material which allows the gas to pass from the inlet, through the partitions and the carbon dioxide absorbing substance to the outlet.

2. Absorption unit as claimed in claim 1 in which the partitions (15) are made of polyether foamed plastic.

3. Absorption unit as claimed in claim 1 in which the container has a circular outer wall (10) and substantially plane bottom (11) and a plane lid (12).

4. Absorption unit as claimed in claims 2 and 3, in which the lid (12) is sealingly fastened to the cylindrical outer wall (10) under compression of the porous material of the partitions (15).

5. Absorption unit as claimed in claim 3, in which the container is provided with a plurality of sector formed chambers (13) surrounding a central, cylindrically formed chamber (14).

6. Absorption unit as claimed in claim 3, in which the inlet and the outlet of the absorption unit are arranged in the cylindrical outer wall of the container and diametrically with regard to each other.

References Cited
UNITED STATES PATENTS

| | | | |
|---|---|---|---|
| 3,464,186 | 9/1969 | Hankison et al. | 55—387 |
| 3,566,867 | 3/1971 | Dryden | 128—188 |
| 3,615,233 | 10/1971 | Doening | 23—252 |

CHARLES N. HART, Primary Examiner

U.S. Cl. X.R.

23—252; 55—387; 128—142.6